US012472759B2

(12) United States Patent
Ishida

(10) Patent No.: US 12,472,759 B2
(45) Date of Patent: Nov. 18, 2025

(54) ROLL PAPER PRINTER

(71) Applicant: SEIKO EPSON CORPORATION, Tokyo (JP)

(72) Inventor: Tetsugo Ishida, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 18/495,143

(22) Filed: Oct. 26, 2023

(65) Prior Publication Data

US 2024/0140116 A1 May 2, 2024

(30) Foreign Application Priority Data

Oct. 28, 2022 (JP) ................................. 2022-173072

(51) Int. Cl.
*B41J 15/04* (2006.01)
*B41J 11/00* (2006.01)
*B41J 15/02* (2006.01)
*B41J 29/13* (2006.01)

(52) U.S. Cl.
CPC ......... *B41J 15/046* (2013.01); *B41J 11/0005* (2013.01); *B41J 15/02* (2013.01); *B41J 29/13* (2013.01)

(58) Field of Classification Search
CPC ........... B41J 15/046; B41J 15/02; B41J 29/13
See application file for complete search history.

(56) References Cited

U.S. PATENT DOCUMENTS

2008/0095564 A1 4/2008 Yada

FOREIGN PATENT DOCUMENTS

| | | | | |
|---|---|---|---|---|
| EP | 1752304 B1 * | 3/2008 | ............. | B41J 29/13 |
| JP | 2008-120069 A | 5/2008 | | |
| KR | 100893440 B1 * | 4/2009 | ........... | B41J 15/046 |

* cited by examiner

*Primary Examiner* — Sharon Polk
(74) *Attorney, Agent, or Firm* — Workman Nydegger

(57) ABSTRACT

A roll paper printer includes a case that includes an accommodation section configured to accommodate roll paper, a cover that rotates about a cover hinge located below the case, and opens and closes the accommodation section, in which the cover includes a cover guide configured to guide the roll paper, the cover guide includes a first cover guide, a second cover guide, and a third cover guide disposed toward the cover hinge, the first cover guide and the second cover guide are configured to come into contact with the roll paper having a first diameter, whereas the third cover guide does not come into contact with the roll paper having the first diameter, when the cover is closed, and the third cover guide is inclined downward toward the accommodation section, and is configured to guide the roll paper to the accommodation section, when the cover is opened.

12 Claims, 10 Drawing Sheets

ROLL PAPER PRINTER

The present application is based on, and claims priority from JP Application Serial Number 2022-173072, filed Oct. 28, 2022, the disclosure of which is hereby incorporated by reference herein in its entirety.

BACKGROUND

1. Technical Field

The present disclosure relates to a roll paper printer.

2. Related Art

In the related art, as described in JP-A-2008-120069, a printer provided with a mechanism that corrects curl of roll paper is known.

In the printer described above, it may be difficult for a user to accommodate the roll paper due to a configuration of the mechanism that corrects the curl of the roll paper or the like.

SUMMARY

The present disclosure is a roll paper printer including a case that is configured to include an accommodation section configured to accommodate roll paper wound with paper, a cover that is configured to rotate about a cover hinge located below the case, and is configured to open and close the accommodation section, a paper guide that is configured to guide the paper, and a protrusion that is configured to come into contact with the paper, and is configured to move toward the paper guide, in which the cover includes a cover guide configured to guide the roll paper, the cover guide includes a first cover guide, a second cover guide, and a third cover guide disposed in this order toward the cover hinge, the first cover guide and the second cover guide are configured to come into contact with the roll paper having a first diameter, whereas the third cover guide does not come into contact with the roll paper having the first diameter, when the cover is closed, and the third cover guide is inclined downward toward the accommodation section, and is configured to guide the roll paper to the accommodation section, when the cover is opened.

DESCRIPTION OF EMBODIMENTS

1. Configuration of Roll Paper Printer

Figure 1:
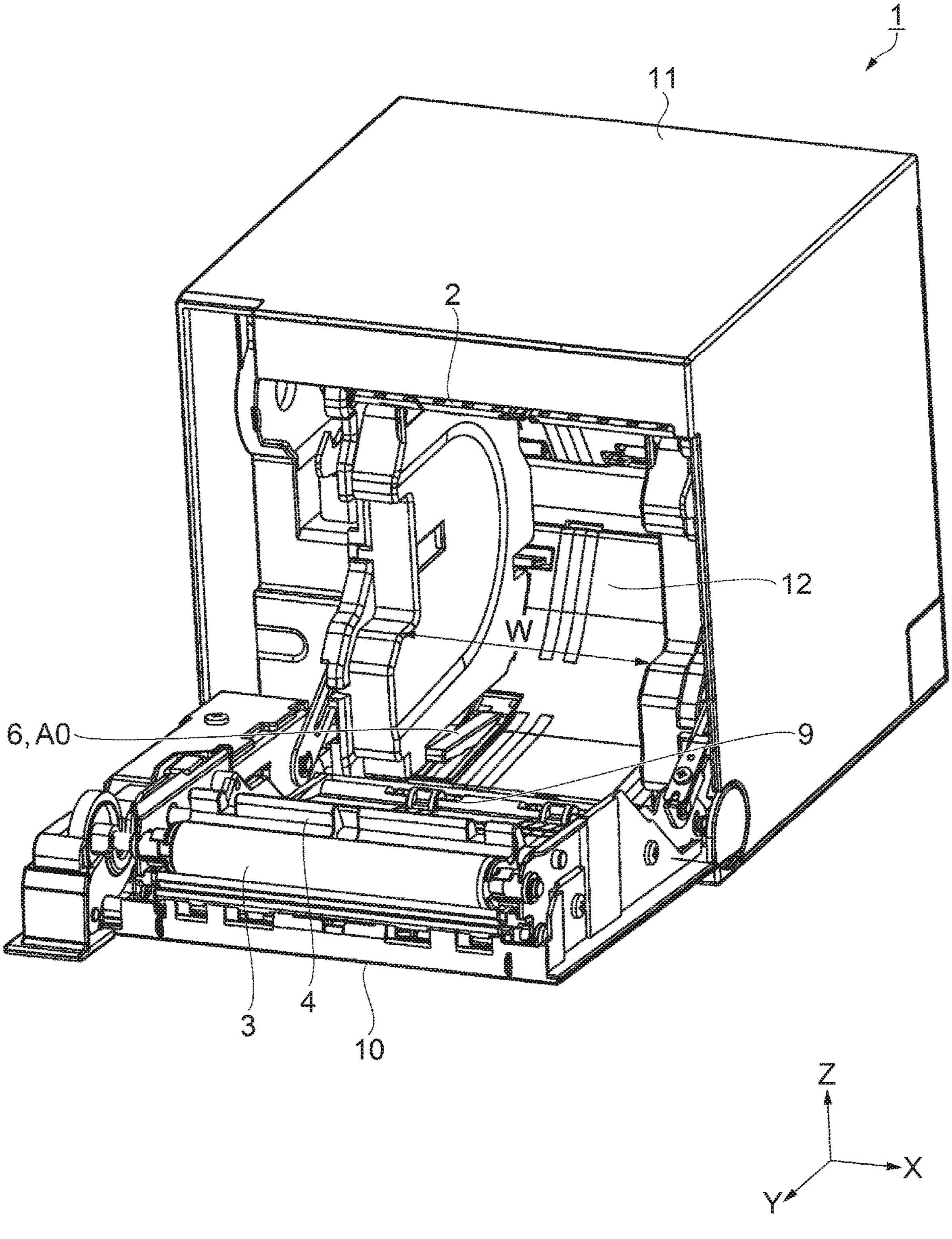
FIG. 1 is a perspective view of a roll paper printer.

Hereinafter, a roll paper printer 1 according to an embodiment will be described with reference to FIGS. 1 to 10. It should be noted that the directions in the drawings will be described by using a three-dimensional coordinate system. For convenience of description, a positive direction of a Z axis is referred to as an up direction, upward, or simply up, a negative direction of the Z axis is referred to as a down direction, downward, or simply down, a positive direction of an X axis is referred to as a right direction, rightward, or simply right, a negative direction of the X axis is referred to as a left direction, leftward, or simply left, a positive direction of a Y axis is referred to as a front direction, forward, or simply front, and a negative direction of the Y axis is referred to as a rear direction, rearward, or simply rear.

The roll paper printer 1 according to the embodiment is used, for example, in a point-of-sale (POS) system. The POS system is a system used in the retail business, such as shopping centers, department stores, convenience stores, and in-car sales, and the food and beverage business, such as restaurants, coffee shops, and taverns. The roll paper printer 1 used in the POS system prints receipts, coupons, tickets, and the like according to products or services.

FIG. 1 illustrates a perspective view of the roll paper printer 1 when roll paper R is not accommodated in an accommodation section 12 in a state in which a cover 10 is opened forward. The roll paper printer 1 is installed on a table or the like on a horizontal surface with a bottom surface facing down. Here, a posture in which the roll paper printer 1 can open the cover 10 forward in one direction of a side surface of a case 11, that is, a so-called vertical installation posture is illustrated. Since there is no roll paper R, a sensor 6 that detects a remaining amount of the roll paper R is at a position A0 advanced upward in the accommodation section 12.

It should be noted that a width of the accommodation section 12 in the left-right direction is a width W, and the roll paper R up to the width W can be accommodated. The width W is, for example, 80 mm.

The cover 10 can open and close the accommodation section 12. A user can access the accommodation section 12 by opening the cover 10 toward the front.

Figure 2:
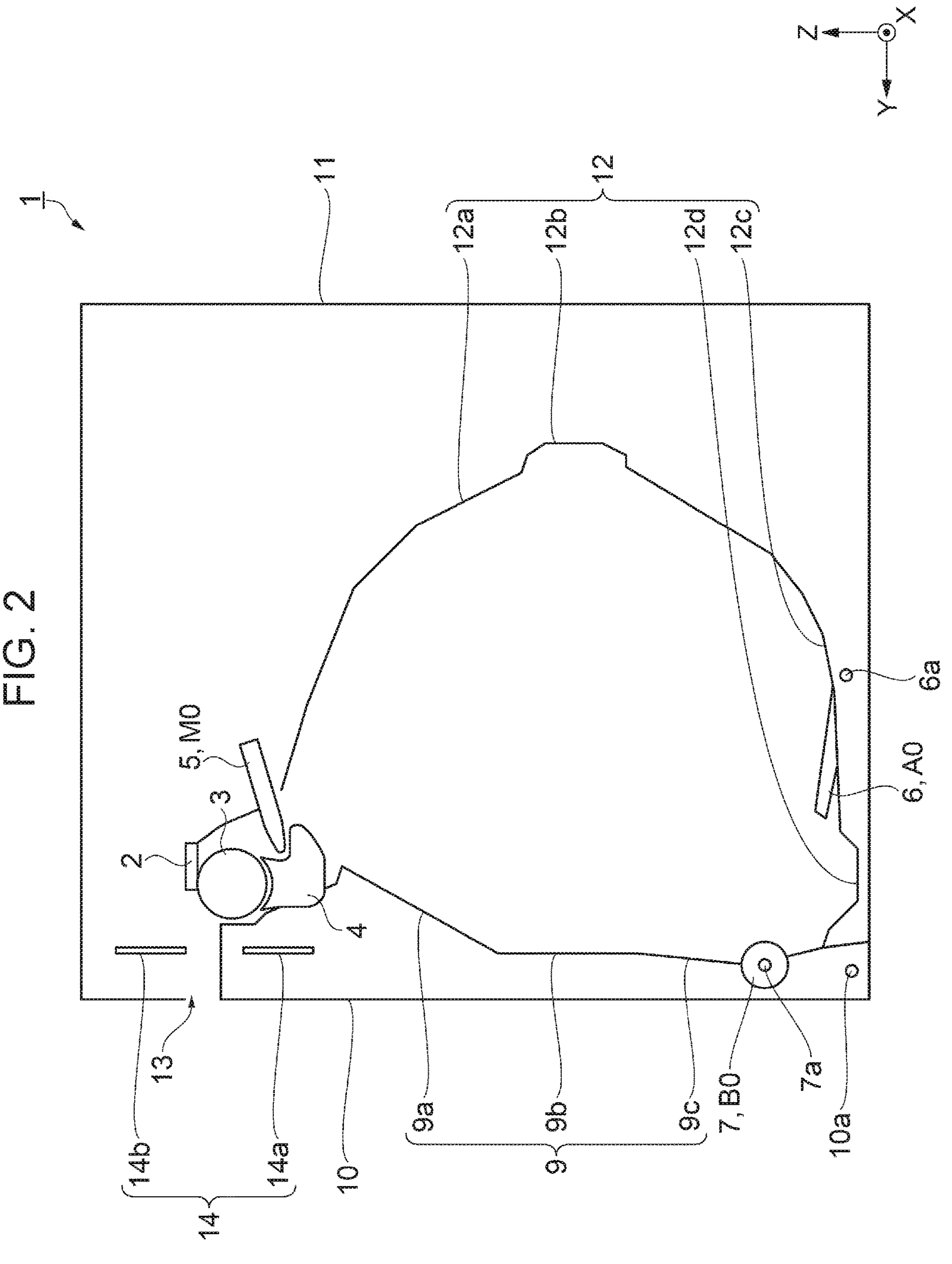
FIG. 2 is a sectional view of the roll paper printer when a cover is closed.
Figure 9:
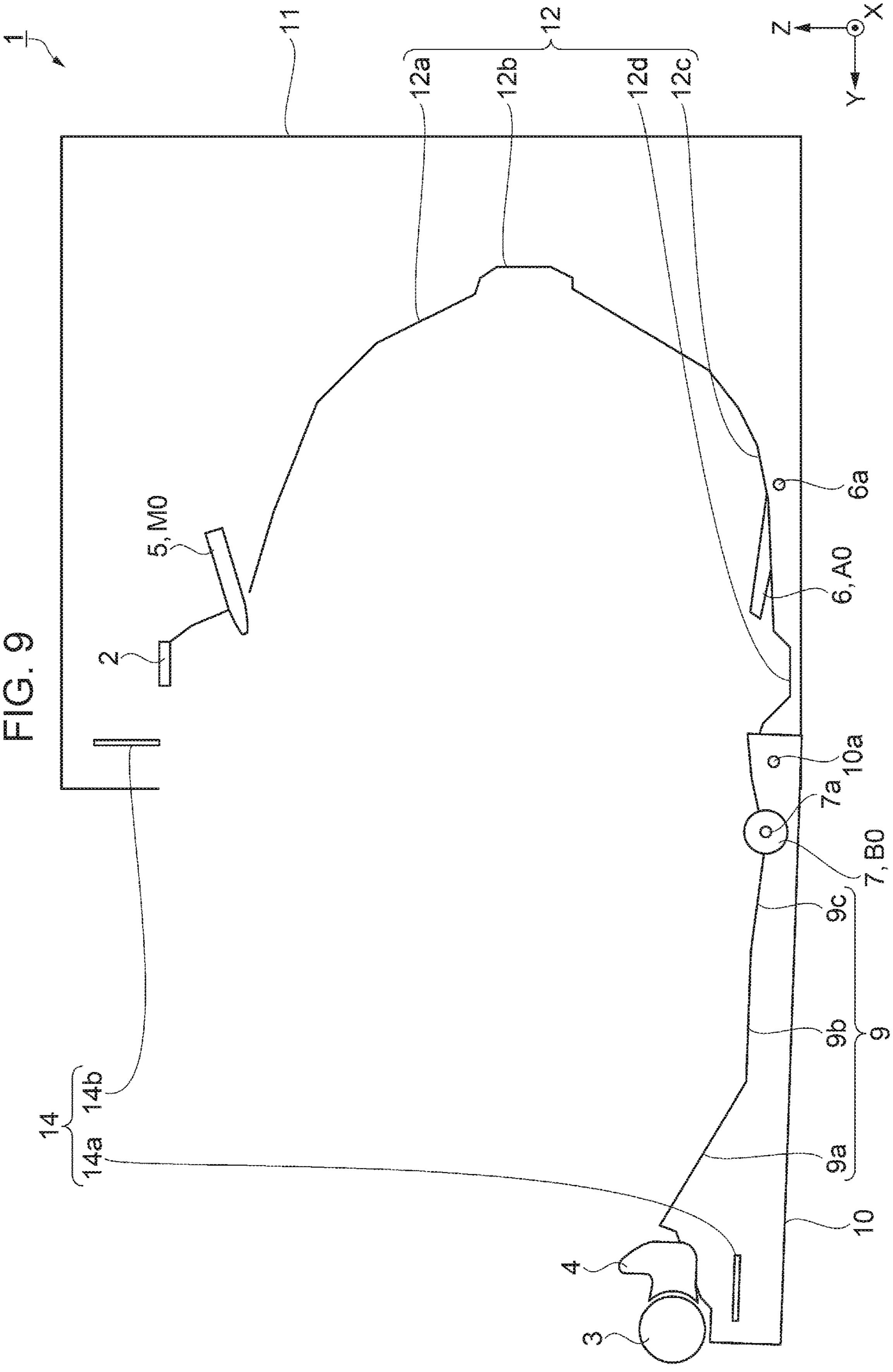
FIG. 9 is a sectional view of the roll paper printer when the cover is opened.
Figure 10:
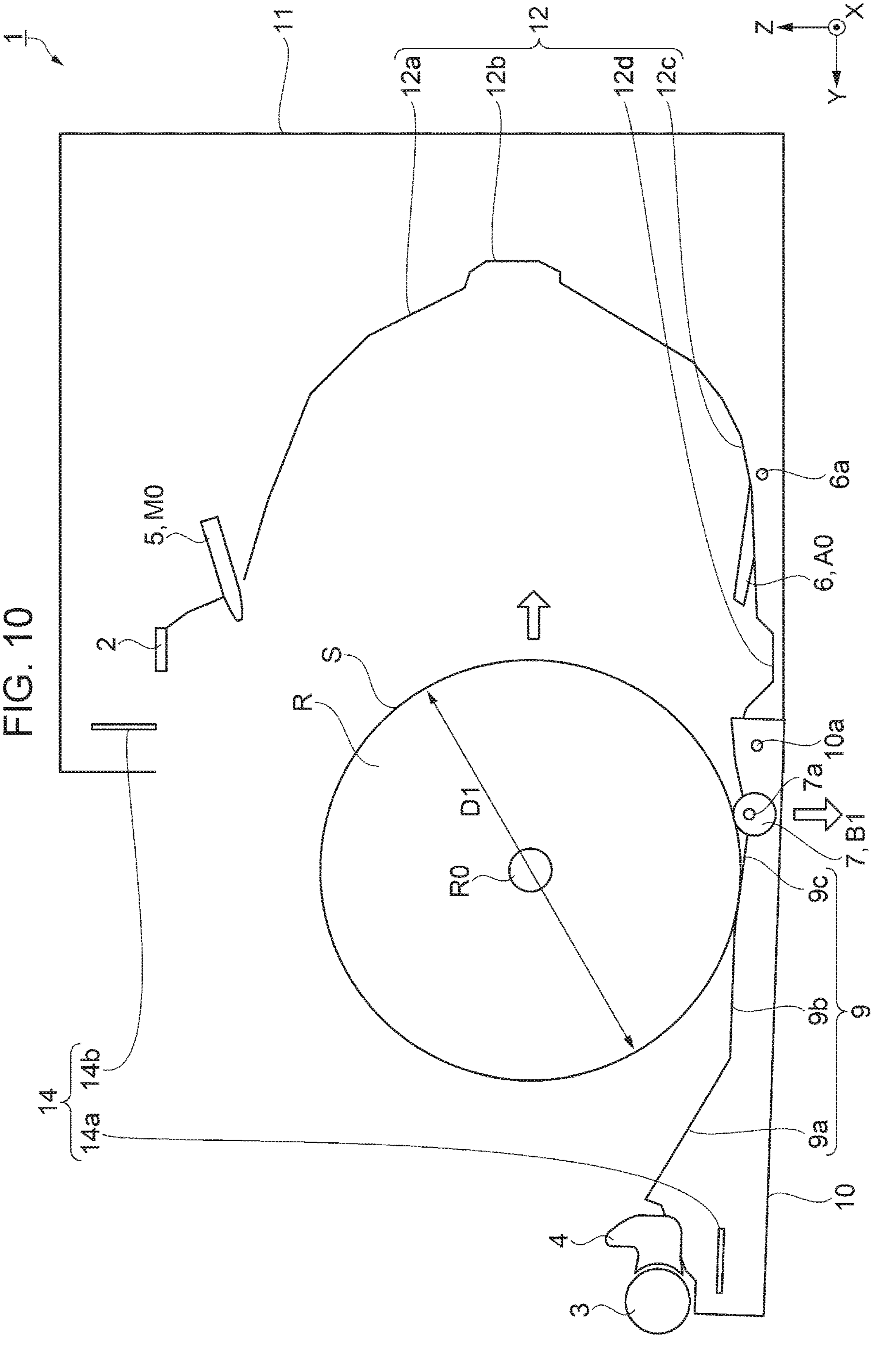
FIG. 10 is a sectional view of the roll paper printer when the roll paper is accommodated.

FIG. 2 illustrates a sectional view of the roll paper printer 1 when the roll paper R is not accommodated in the accommodation section 12 in a state in which the cover 10 is closed. It should be noted that FIGS. 2 to 6 and 8 illustrate sectional views of the roll paper printer 1 in a state in which the cover 10 is closed, and FIGS. 9 to 10 illustrate sectional views of the roll paper printer 1 in a state in which the cover 10 is opened.

The roll paper printer 1 includes a head 2, a platen 3 which is a transport roller, a paper guide 4, a protrusion 5, and a cutter 14, in addition to the sensor 6 and the accommodation section 12. In addition, the roll paper printer 1 is provided with a controller (not illustrated) including a processor that can control each section.

The head 2, the protrusion 5, the sensor 6, the accommodation section 12, and a stationary blade **14*b* of the cutter 14 are mounted on the case 11. On the other hand, the platen 3, the paper guide 4, a roller 7 which is a contact member, a cover guide 9, and a movable blade 14*a* of the cutter 14 are mounted on the cover 10**.

The cover 10 is attached to the side surface of the case 11 by a cover hinge **10*a*. The cover 10 can rotate about the cover hinge 10***a*. The cover hinge 10*a* is at a position opposite to the head 2 located above the case 11. That is, the cover hinge 10*a* is located below the case 11 and near the bottom surface.

When the cover 10 is closed, a discharge port 13 having a rectangular shape is formed at a boundary between the cover 10 and the case 11.

In addition, when the cover 10 is closed, the platen 3 mounted on the cover 10 is at a position that faces the head 2 mounted on the case 11.

Further, in this case, the movable blade 14*a* of the cutter 14 mounted on the cover 10 is at a position that faces the stationary blade 14*b* mounted on the case 11.

The sensor 6 is mounted on the accommodation section 12 and is configured to detect the remaining amount of the roll paper R. The sensor 6 has a lever shape, and can rotate about a sensor hinge 6*a*. In the present embodiment, since an angle at which the sensor 6 rotates is small, it can be approximately regarded that the sensor 6 can move in the up-down direction. Hereinafter, the sensor 6 will be described as moving to the up direction or the down direction. In addition, the sensor 6 is configured to advance and retreat with respect to a third accommodation section 12*c*, which will be described below.

An elastic member (not illustrated), such as a spring, is attached on the periphery of the sensor hinge 6*a*, and presses the sensor 6 to rotate clockwise. The sensor 6 is pressed upward by the elastic member.

The sensor 6 includes a detector (not illustrated) that can detect a position of the sensor 6. It should be noted that the detector may be a mechanical type, such as a switch, or may be an optical type, such as a photo sensor. The sensor 6 is also referred to as a near end sensor.

Figure 8:
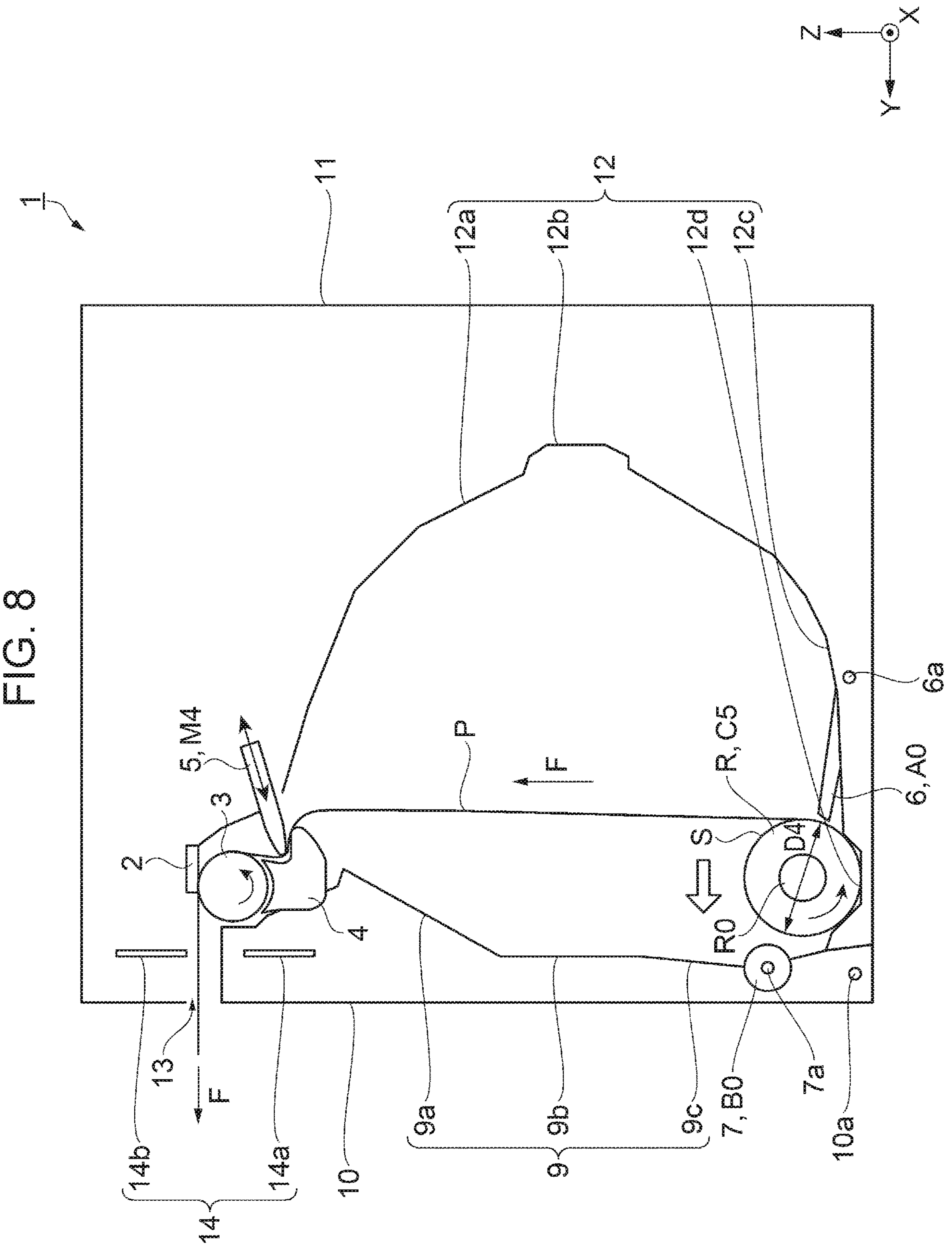
FIG. 8 is a sectional view of the roll paper printer when the roll paper is at a near end.

As illustrated in FIG. 8, which will be described below, as a diameter of the roll paper R is reduced, the sensor 6 is at the highest position A0 due to a pressing force of the elastic member. In addition, even when the roll paper R is not accommodated in the accommodation section 12, the sensor 6 is at the position A0.

When the sensor 6 is at the position A0, the sensor 6 can detect a so-called near end, which is a state in which a remaining amount of paper P wound on the roll paper R is reduced. As described above, the sensor 6 can detect the remaining amount of the roll paper R. The controller can know whether or not the roll paper R is at the near end as the remaining amount of the roll paper R by the sensor 6.

On the other hand, the sensor 6 does not detect the near end when the sensor 6 is at a position other than the position A0. That is, when the sensor 6 is at the position other than the position A0, the sensor 6 can detect that the remaining amount of the roll paper R is sufficient.

The roll paper printer 1 can continuously perform the printing within a range in which the remaining amount of the roll paper R remains even when the sensor 6 detects the near end. The roll paper printer 1 is provided with a display device (not illustrated), and can display the near end.

When the user visually recognizes the near end display of the display device, the user can continuously perform the printing when the printing is required, such as when customers are lined up for accounting. The user can accommodate new roll paper R in the roll paper printer 1 at a time when the printing is finished or when the customers stop lining up.

It should be noted that the roll paper printer 1 may be configured to separately mount a paper detection sensor (not illustrated) that can detect the presence or absence of the paper P on the paper guide 4 or the protrusion 5. The controller can determine whether or not there is no paper P in the roll paper printer 1 by using the paper detection sensor, and can determine whether or not the printing can be performed. When the sensor 6 detects the near end and the paper detection sensor detects that there is no paper P, the controller can stop the printing.

The accommodation section 12 and the cover guide 9 are configured to guide the roll paper R of which the diameter changes as the paper P is consumed by the printing.

The accommodation section 12 includes a first accommodation section 12*a*, a second accommodation section 12*b*, the third accommodation section 12*c*, and a fourth accommodation section 12*d*, which are disposed in an order from the up to the down, that is, in an order toward the cover hinge 10*a*. The cover guide 9 includes a first cover guide 9*a*, a second cover guide 9*b*, and a third cover guide 9*c*, which are disposed in the order from the up to the down, that is, in the order toward the cover hinge 10*a*.

As will be described below, the first accommodation section 12*a* and the first cover guide 9*a* suppress the roll paper R by coming into contact with the roll paper R when the roll paper R that rotates as the paper P is pulled out by the platen 3 bounces upward or the like.

In addition, when the roll paper printer 1 is in a posture in which the cover 10 can be opened upward, that is, in a so-called horizontal placement posture, the second accommodation section 12*b* having a recessed shape can stably support the roll paper R.

The roller 7 is attached to the third cover guide 9*c*, which is a lower portion of the cover guide 9. The roller 7 is located above the cover hinge 10*a*. The roller 7 can rotate about a shaft 7*a*. As will be described below, the roller 7 is configured to move in the front-rear direction with respect to the third cover guide 9*c*. When the roller 7 comes into contact with the roll paper R and is not pressed, the roller 7 is at a position B0.

The protrusion 5 is a mechanism that corrects curl of the paper P. The protrusion 5 is pressed toward the paper guide 4 by an elastic force of an elastic member for a protrusion (not illustrated), such as a spring. When the protrusion 5 does not come into contact with the paper P, the protrusion 5 is at a position M0 that protrudes most toward the paper guide 4.

2. About Diameter of Roll Paper 2-1. When Roll Paper has Large Diameter

Figure 3:
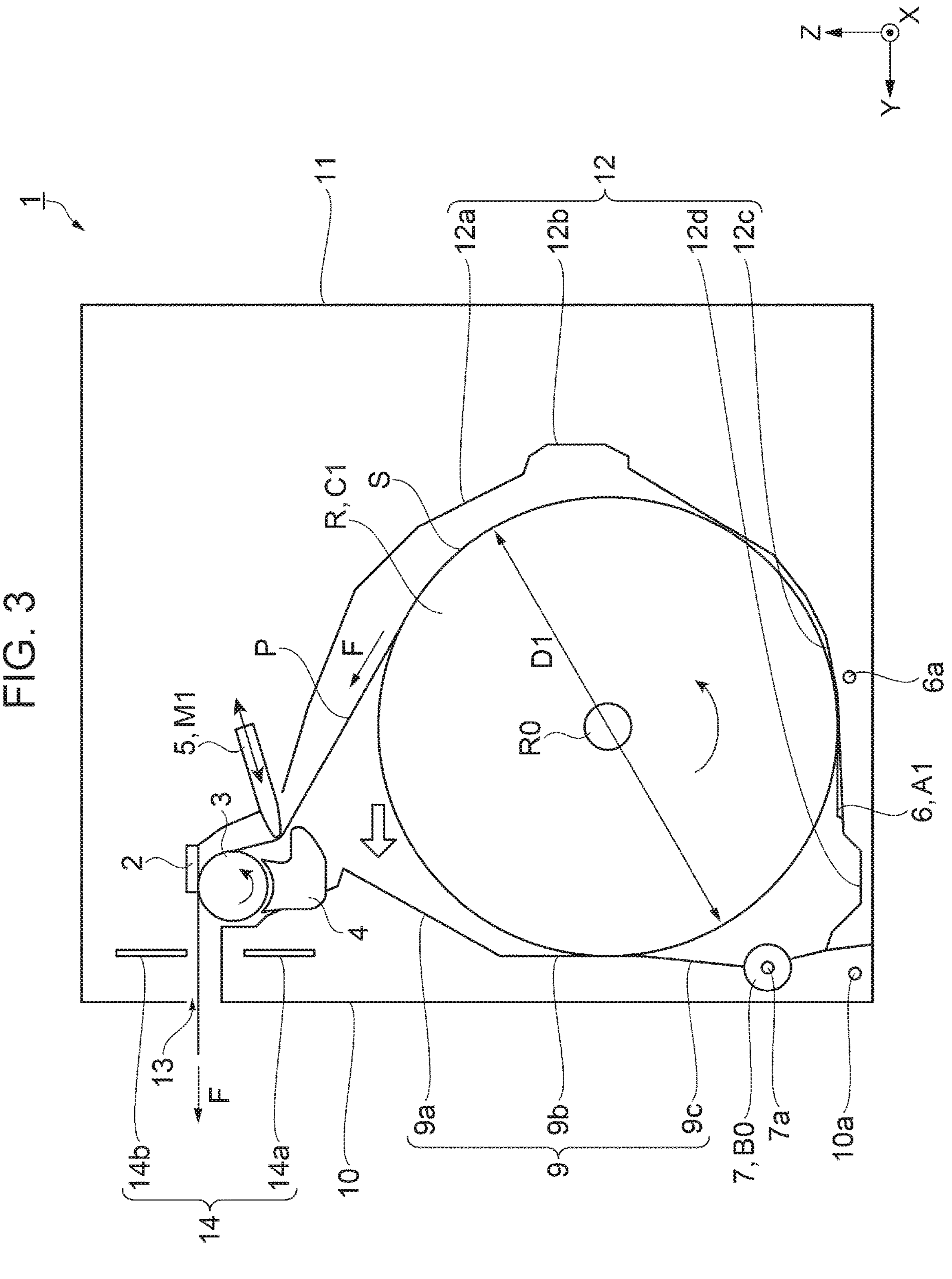
FIG. 3 is a sectional view of the roll paper printer when roll paper has a large diameter.

FIG. 3 illustrates the roll paper printer 1 at the time of the printing, in which the roll paper R having an outer diameter D1, which is a first diameter and a large diameter, is accommodated in the accommodation section 12. The outer diameter D1 is, for example, 83 mm. The roll paper R is at a position C1 to which the roll paper R guided by coming into contact with the third accommodation section 12*c* of the accommodation section 12 and the second cover guide 9*b* of the cover guide 9.

The paper P is, for example, long heat sensitive paper. A front surface of the paper P in contact with the head 2 is coated with a heat sensitive material, and an image can be printed by the head 2. A back surface of the paper P is a surface that comes into contact with the platen 3.

The roll paper R is wound on a winding core R0 such that the front surface of the paper P is on an outside and the back surface is on an inside. As the paper P is wound closer to the winding core R0 of the roll paper R, that is, as the paper P is wound closer to a portion in which the outer diameter of the roll paper R is small, the curl is stronger. The outer diameter of the winding core R0 is, for example, 18 mm. It should be noted that, in the present embodiment, the outer diameter is also simply referred to as a diameter.

The width of the paper P is, for example, 80 mm. A partition plate (not illustrated) can be inserted into the right of the accommodation section 12 according to the width of the roll paper R corresponding to the paper P to be used. Due to the partition plate, even the roll paper R having a width smaller than 80 mm, for example, 58 mm, can be stably accommodated on the left and right in the accommodation section 12. It should be noted that the partition plate may be insertable into the left of the accommodation section 12, or may be insertable into the left or right of the accommodation section 12.

The platen 3 rotates counterclockwise indicated by an arrow by a motor for a platen (not illustrated) to transport the paper P in a transport direction F. In this case, as the paper P is pulled out from the roll paper R by the platen 3, the roll paper R also rotates counterclockwise.

From upstream toward downstream in the transport direction F, the accommodation section 12, the paper guide 4 and the protrusion 5 which face each other, the platen 3 and the head 2 which face each other, the cutter 14, and the discharge port 13 are disposed in this order.

The protrusion 5 and the paper guide 4 can guide the paper P upstream in the transport direction F of the platen 3. The protrusion 5 can come into contact with the paper P, and can move toward the paper guide 4.

With respect to the paper P curled toward the back surface, the protrusion 5 comes into contact with the paper P from the front surface, and acts to correct the curl of the paper P. The protrusion 5 can correct the curl by drawing the paper P transported by the platen 3, while coming into contact with the front surface of the paper P and bending the paper P.

When the roll paper R has a large diameter as the diameter D1, a load is increased due to the inertia of the roll paper R, and tension of the paper P transported by the platen 3 is also increased. The protrusion 5 receives the tension of the paper P, resists the elastic force of the elastic member for the protrusion, and moves in a direction separated from the paper guide 4. In FIG. 3, the protrusion 5 is at a position M1 that is most separated from the paper guide 4.

In the protrusion 5 at the position M1, an angle of bending the paper P is increased, and an action of correcting the curl is weakened. On the other hand, since the paper P is wound on a portion of the roll paper R having a large diameter, the curl is weak. As described above, the protrusion 5 corresponds to the paper P having weak curl pulled out from the roll paper R having the diameter D1, and can appropriately correct the curl.

In addition, when the roll paper R rotates, due to a change in a situation of the load of the inertia, the friction between an outer circumference S of the roll paper R and the accommodation section 12, or the like due to the forward/rearward movement or the bounce, a load fluctuation may occur. The protrusion 5 can also alleviate a change in the tension of the paper P due to the load fluctuation while pressing the paper P toward the paper guide 4, and advancing and retreating with respect to the paper guide 4.

The head 2 is, for example, a line-type thermal head in which a plurality of heat generating elements are arranged in the left-right direction. The plurality of heat generating elements of the head 2 can be selected based on print data to generate heat, and can print an image on the paper P, which is the heat sensitive paper.

The platen 3 and the head 2 are at positions that face each other with the paper P pulled out from the roll paper R interposed therebetween. The platen 3 can come into contact with the back surface of the paper P to perform the transportation, and the head 2 can come into contact with the front surface of the paper P to perform the printing.

The platen 3 located at a position that faces the head 2 with the paper P interposed therebetween is also referred to as a platen roller.

The movable blade 14*a* and the stationary blade 14*b* of the cutter 14 are at positions that face each other with the paper P interposed therebetween. The movable blade 14*a* can move toward the stationary blade 14*b* to cut the paper P between the movable blade 14*a* and the stationary blade 14*b*. The cut paper P is discharged from the discharge port 13. It should be noted that the movable blade 14*a* may be mounted on the case 11, and the stationary blade 14*b* may be mounted on the cover 10.

The sensor 6 can come into contact with the outer circumference S of the roll paper R. The sensor 6 is pressed by the roll paper R having the diameter D1 and is at a lower position A1, which is also a position of a surface of the third accommodation section 12*c*. The sensor 6 can detect that the remaining amount of the roll paper R is sufficient, based on the position A1.

It should be noted that, since the roll paper R having the diameter D1 has a large diameter, the roll paper R is at a position C1 that does not come into contact with the third cover guide 9*c* and the roller 7 located below the cover 10. The roller 7 is at the position B0 as when the roll paper R is not accommodated in the accommodation section 12.

By the way, as described above, when the platen 3 transports the paper P, the paper P of the roll paper R is also pulled out, and the roll paper R also rotates counterclockwise in the accommodation section 12. Along with this rotation, a force for causing the roll paper R to move in the front direction acts on the roll paper R.

The roll paper R is pressed toward the second cover guide 9*b* of the cover guide 9 by this force. As a result, the outer circumference S of the roll paper R rotates while rubbing the second cover guide 9*b*.

In this case, it may not be possible for the sensor 6 to detect the remaining amount of the roll paper with high accuracy due to the load of the inertia of the roll paper R, the friction between the outer circumference S of the roll paper R and the second cover guide 9*b*, or the like.

That is, when the load of the inertia of the roll paper R, the friction between the outer circumference S of the roll paper R and the second cover guide 9*b*, or the like is high, the load and the load fluctuation when the platen 3 transports the paper P are also increased. Therefore, when the platen 3 transports the paper P, the roll paper R may also move forward and rearward, or bounces upward in some cases. In particular, the platen 3 is remarkable when the platen 3 starts transporting the paper P. In this case, when the sensor 6 moves upward from the position A1, the near end may be erroneously detected. It should be noted that, hereinafter, it is assumed that the load of the friction or the like includes the load based on the inertia of the roll paper R.

The first accommodation section 12*a* and the first cover guide 9*a* can suppress the roll paper R by coming into contact with the roll paper R when the roll paper R that rotates as the paper P is pulled out by the platen 3 bounces upward or the like.

The cover guide 9 is made of, for example, a resin, such as polyethylene. On the other hand, in the cover guide 9, the second cover guide 9*b*, which is at least a portion of the cover guide 9 that comes into contact with the outer circumference S of the roll paper R, is covered with, for example, a sheet (not illustrated) containing ultra high molecular weight polyethylene. The sheet containing the ultra high molecular weight polyethylene is also referred to as a so-called low friction sheet.

The ultra high molecular weight polyethylene is obtained by increasing the molecular weight to 1 to 7 million, while the molecular weight of ordinary polyethylene is 20,000 to 300,000. The ultra high molecular weight polyethylene sheet can reduce friction between the material and the material that comes into contact with the material, as compared with the polyethylene cover guide 9.

As described above, the cover 10 has the cover guide 9 that can guide the roll paper R. The second cover guide 9*b*, which is at least a portion of the cover guide 9, is covered with the sheet containing the ultra high molecular weight polyethylene, and has smaller friction with the outer circumference S of the roll paper R than other portions of the cover guide 9 made of a resin, such as polyethylene.

The second cover guide 9*b*, which is covered with the sheet containing the ultra high molecular weight polyethylene, can reduce the load of the friction with the outer circumference S when the roll paper R rotates. As a result, the load and the load fluctuation when the platen 3 transports the paper P can be made smaller.

The second cover guide 9*b* covered with the sheet can suppress the forward/rearward movement or the bounce of the roll paper R when the platen 3 transports the paper P. By suppressing the forward/rearward or upward movement of the roll paper R, the upward movement of the sensor 6 from the position A1 is also suppressed, and the remaining amount of the roll paper can be detected with higher accuracy.

It should be noted that, instead of the configuration in which the roll paper R having the outer diameter D1 comes into contact with the second cover guide 9*b*, a configuration may be adopted in which the roll paper R having the outer diameter D1 comes into contact with the first cover guide 9*a* and does not come into contact with the second cover guide 9*b*. In this case, when the cover 10 is closed, since the first cover guide 9*a* blocks a space above the roll paper R having the outer diameter D1 and comes into contact with the roll paper R, the upward bounce of the roll paper R can be suppressed. In this case, the first cover guide 9*a* may be covered with the sheet containing the ultra high molecular weight polyethylene.

2-2. When Roll Paper has Medium Diameter

Figure 4:
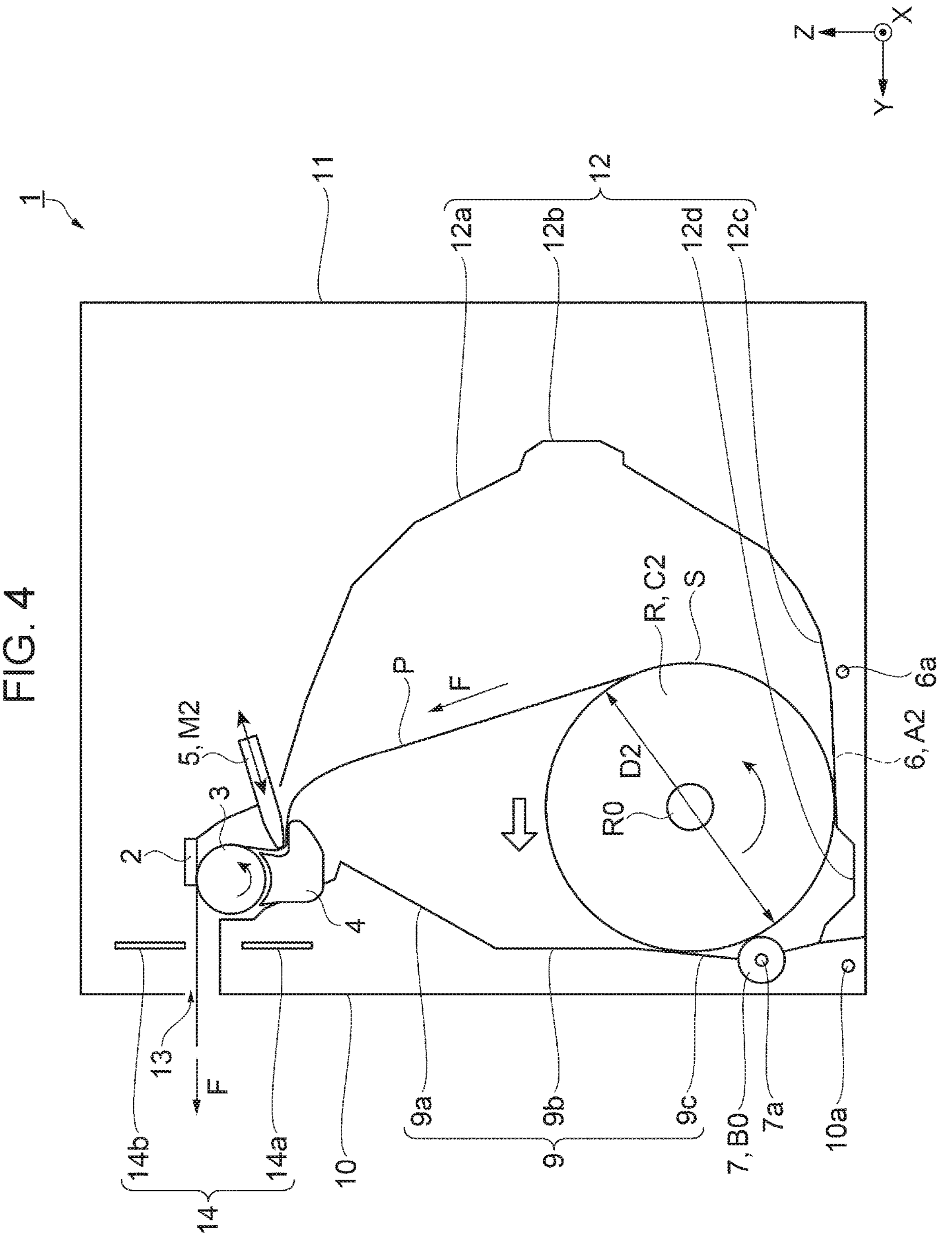
FIG. 4 is a sectional view of the roll paper printer when the roll paper has a medium diameter.

The paper P is printed and consumed, and the roll paper R becomes the roll paper R having a diameter D2, which is a second diameter, is a medium diameter, and is smaller than the diameter D1 which is a large diameter. The diameter D2 is, for example, 60 mm. FIG. 4 illustrates the roll paper printer 1 at the time of the printing, in which the roll paper R having the diameter D2 is accommodated in the accommodation section 12.

The roll paper R is at a position C2 to which the roll paper R guided by coming into contact with the third accommodation section 12*c* of the accommodation section 12 and the third cover guide 9*c* of the cover guide 9. Also, the position of the winding core R0, which is a position of the center of gravity of the roll paper R having the diameter D2, moves in the front-down direction as compared to when the roll paper R has the diameter D1.

When the roll paper R has the diameter D2, a distal end of the sensor 6 comes into contact with the outer circumference S of the roll paper R, and the sensor 6 is at a position A2 which is lower than the position A1 when the roll paper R has the diameter D1. The sensor 6 can continuously detect that the remaining amount of the roll paper R is sufficient, based on the position A2.

As described above, when the roll paper R rotates in the accommodation section 12, a force for causing the roll paper R to move to the third cover guide 9*c* in the front direction acts on the roll paper R.

The roll paper R having the diameter D2 is at the position C2, and the outer circumference S comes into contact with the roller 7 mounted on the third cover guide 9*c*. In this case, the roller 7 is at the position B0.

The roller 7 can rotate smoothly while coming into contact with the outer circumference S of the roll paper R. The rotating roller 7 can reduce the load of the friction or the like when the roll paper R rotates. As a result, the load and the load fluctuation when the platen 3 transports the paper P can be made smaller.

The roller 7 can suppress the forward/rearward movement or the bounce of the roll paper R. By suppressing the forward/rearward or upward movement of the roll paper R, the upward movement of the sensor 6 from the position A2 is also suppressed, and the remaining amount of the roll paper can be detected with higher accuracy.

The tension of the paper P is smaller when the roll paper R has the smaller diameter D2 than when the roll paper R has the diameter D1. As a result, the protrusion 5 further moves toward the paper guide 4 and moves from the position M1 to a position M2 due to the reduced tension of the paper P.

The protrusion 5 at the position M2 has a smaller angle of bending the paper P than the protrusion 5 at the position M1, and has a stronger action of correcting the curl. On the other hand, since the paper P is wound on a portion of the roll paper R having a medium diameter, the curl is stronger. As described above, the protrusion 5 corresponds to the paper P having stronger curl pulled out from the roll paper R having the diameter D2, and can appropriately correct the curl.

In addition, also in this case, the protrusion 5 can alleviate a change in the tension of the paper P due to the load fluctuation while pressing the paper P toward the paper guide 4, and advancing and retreating with respect to the paper guide 4.

2-3. When Roll Paper has Small Diameter

Figure 5:
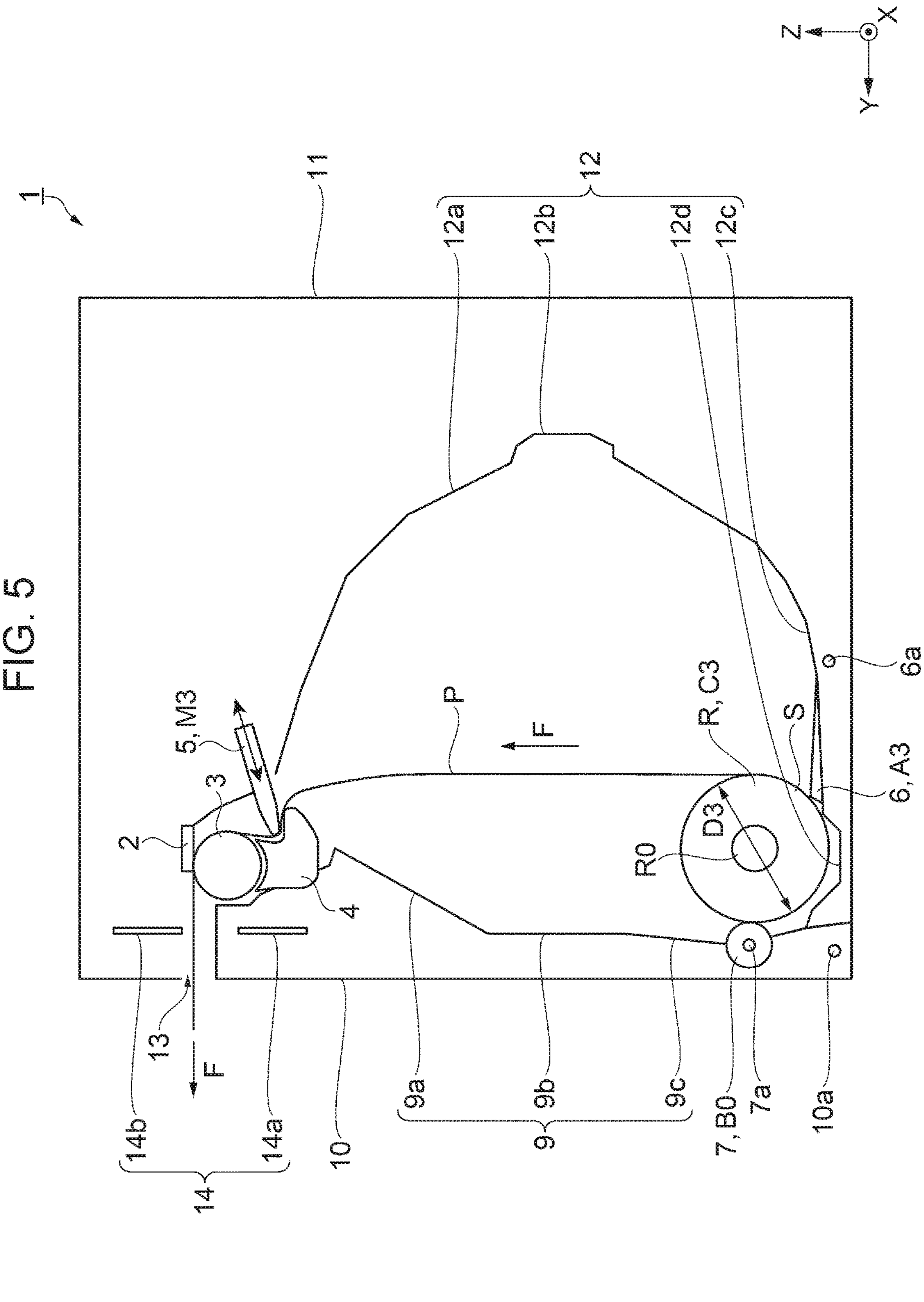
FIG. 5 is a sectional view of the roll paper printer when the roll paper has a small diameter at the time of a standby.
Figure 6:
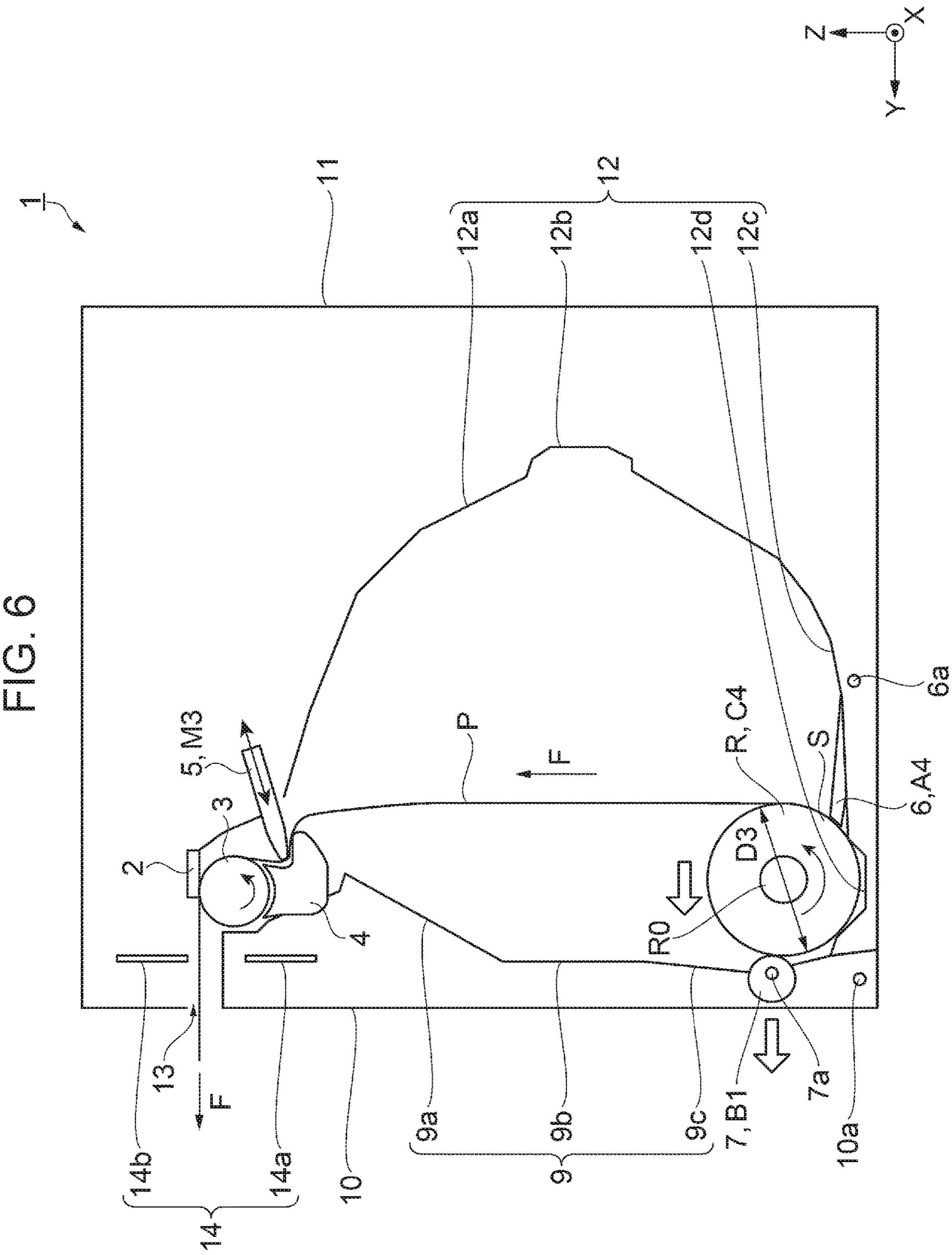
FIG. 6 is a sectional view of the roll paper printer when the roll paper has a small diameter at the time of printing.

When the paper P is printed and further consumed, the roll paper R becomes the roll paper R having a diameter D3, which is even smaller than the diameter D2 as a medium diameter, is a third diameter, and is a small diameter. The diameter D3 is, for example, 30 mm. FIG. 5 illustrates the roll paper printer 1 at the time of a standby, in which the roll paper R having the diameter D3 is accommodated in the accommodation section 12 and is not printed. On the other hand, FIG. 6 illustrates the roll paper printer 1 when printing the roll paper R having the diameter D3.

First, the roll paper printer 1 at the time of the standby of FIG. 5 will be described. The platen 3 does not transport the paper P, and the roll paper R does not rotate. Therefore, a force for causing the roll paper R to move in the front direction does not act on the roll paper R.

The roll paper R is at a position C3 to which the roll paper R guided by coming into contact with the fourth accommodation section 12*d* of the accommodation section 12 and the roller 7 of the third cover guide 9*c* of the cover guide 9. In particular, a rear side of the roll paper R is guided by a rear edge of the fourth accommodation section 12*d* having a recessed shape. The roll paper R is interposed between the roller 7 and the rear edge of the fourth accommodation section 12*d*. Also, the position of the winding core R0, which is a position of the center of gravity of the roll paper R having the diameter D3, further moves in the front-down direction as compared to when the roll paper R has the diameter D2.

When the roll paper R has the diameter D3, the sensor 6 comes into contact with the outer circumference S of the roll paper R, and the sensor 6 is at a position A3 which is higher than the position A2 when the roll paper R has the diameter D2. The sensor 6 can continuously detect that the remaining amount of the roll paper R is sufficient, based on the position A3.

The outer circumference S of the roll paper R is in a state of coming into contact with the roller 7 of the third cover guide 9*c*. Here, since the force for causing the roll paper R to move in the front direction does not act on the roll paper R, the roll paper R does not press the roller 7 in the front direction. In this case, since the roller 7 is not pressed, the roller 7 is at the position B0. The outer circumference S of the roll paper R does not come into contact with the third cover guide 9*c*.

Next, the roll paper printer 1 at the time of the printing of FIG. 6 will be described. The roll paper R is at a position C4 to which the roll paper R guided by coming into contact with the fourth accommodation section 12*d* of the accommodation section 12 and the roller 7 of the third cover guide 9*c* of the cover guide 9. Also, the position of the winding core R0, which is a position of the center of gravity of the roll paper R at the time of the printing, also moves in the front-down direction as compared to the time of the standby.

At the time of the printing, the sensor 6 comes into contact with the outer circumference S of the roll paper R, and is at a position A4 which is higher than the position A3 at the time of the standby. The sensor 6 can detect that the remaining amount of the roll paper R is sufficient, based on the position A4.

Since the platen 3 transports the paper P at the time of the printing, the roll paper R rotates in the accommodation section 12. As described above, the force for causing the roll paper R to move in the front direction acts on the roll paper R. The roll paper R having the diameter D3 has the outer circumference S that comes into contact with the roller 7, and moves to further press the roller 7 in the front direction. The roller 7 is pressed by the roll paper R, and moves forward from the position B0 to a position B1.

The roller 7 can rotate smoothly while being pressed by the roll paper R and moving from the position B0 to the position B1 while coming into contact with the outer circumference S of the roll paper R. The roller 7 that rotates can reduce the load of the friction or the like when the roll paper R rotates, and can suppress the load and the load fluctuation when the platen 3 transports the paper P.

Then, by suppressing the forward/rearward or upward movement of the roll paper R, the upward movement of the sensor 6 from the position A4 is also suppressed, and the remaining amount of the roll paper can be detected with higher accuracy.

By the way, the sensor 6 comes into contact with the outer circumference S of the roll paper R that rotates. A portion in which the sensor 6 comes into contact with the outer circumference S of the roll paper R is referred to as a contacting point. In the example of FIG. 6, the distal end of the sensor 6 comes into contact with the outer circumference S of the roll paper R, and the contacting point serves as the distal end of the sensor 6. When the platen 3 transports the paper P and the roll paper R rotates in the accommodation section 12, the roll paper R is interposed between the contacting point and a portion that faces the position of the contacting point.

When it is supposed that the third cover guide 9*c* does not have the roller 7, the portion that faces the position of the contacting point serves as a portion in which the roll paper R directly comes into contact with the third cover guide 9*c*. When the roll paper R attempts to rotate, high friction is generated with the third cover guide 9*c*. This load of the friction acts as moment of force, and acts at the contacting point that is the position that faces the portion in which the roll paper R comes into contact with the third cover guide 9*c*, such that the roll paper R bites into the distal end of the sensor 6.

This action can be a factor that causes a large load and a large load fluctuation with respect to the transportation of the paper P by the platen 3. As a result, the roll paper R may move forward and rearward or upward, and the sensor 6 may also move upward from the position A4, which may result in the erroneous detection of the near end.

In addition, in this case, when the roll paper R is pulled in the transport direction F along with the transportation of the paper P by the platen 3, the distal end of the sensor 6 may also be pulled in the transport direction F in a state in which the distal end of the sensor 6 also bites into the roll paper R. When the sensor 6 is pulled in the transport direction F and is at the position A0 which is higher than the position A4, the near end is erroneously detected.

In the embodiment, the roller 7 is disposed at a position that faces the position of the contacting point with the roll paper R interposed therebetween. The roller 7 can rotate smoothly while coming into contact with the outer circumference S of the roll paper R. The roller 7 that rotates can suppress the biting of the distal end of the sensor 6 into the roll paper R, and can reduce the load of the friction or the like when the roll paper R rotates. As a result, the load and the load fluctuation when the platen 3 transports the paper P can be made smaller.

It should be noted that the position of the roller 7 does not have to be a position at which an angle formed with the position of the contacting point is 180 degrees with the winding core R0 of the roll paper R as the center. This angle may be in a range of 150 degrees to 210 degrees.

In addition, even when it is supposed that the distal end of the sensor 6 is in a state of biting into the roll paper R, the roller 7 can rotate together with the roll paper R when the roll paper R is pulled in the transport direction F.

Further, the roller 7 can move from the position B0 toward the position B1, that is, in the front direction and is a direction intersecting the transport direction F. It is possible to alleviate the biting of the distal end of the sensor 6 into the roll paper R.

As described above, the roller 7 at the position that faces the position of the contacting point with the roll paper R interposed therebetween can suppress the forward/rearward or upward movement of the roll paper R or the upward movement of the sensor 6 due to pulling. As a result, the sensor 6 can detect the remaining amount of the roll paper with higher accuracy.

It should be noted that, in the above description, the example is described in which the roller 7 is mounted on the cover guide 9 of the cover 10. The roller 7 need only be at the position that faces the position of the contacting point with the roll paper R interposed therebetween, and may be mounted on, for example, the fourth accommodation section 12*d* or the case 11 extending upward from the lower front.

It should be noted that, at the time of the printing, the outer circumference S of the roll paper R may also come into contact with the third cover guide 9*c* in addition to the roller 7. In the third cover guide 9*c* as well, a portion of the roll paper R that comes into contact with the outer circumference S may be covered with the sheet containing the ultra high molecular weight polyethylene. The third cover guide 9*c* that is covered with the sheet can reduce the load of the friction when the roll paper R rotates.

The tension of the paper P is smaller when the roll paper R has the smaller diameter D3 than when the roll paper R has the diameter D2. As a result, the protrusion 5 further moves toward the paper guide 4 and moves from the position M2 to a position M3 due to the reduced tension of the paper P.

In the protrusion 5 at the position M3, as compared to the protrusion 5 at the position M2, an angle of bending the paper P is even smaller, and an action of correcting the curl is even stronger. On the other hand, since the paper P is wound on a portion of the roll paper R having an even smaller diameter, the curl is even stronger. As described above, the protrusion 5 corresponds to the paper P having even stronger curl pulled out from the roll paper R having the diameter D3, and can appropriately correct the curl.

In addition, also in this case, the protrusion 5 can alleviate the change in the tension of the paper P due to the load fluctuation while pressing the paper P toward the paper guide 4, and advancing and retreating with respect to the paper guide 4.

Figure 7:
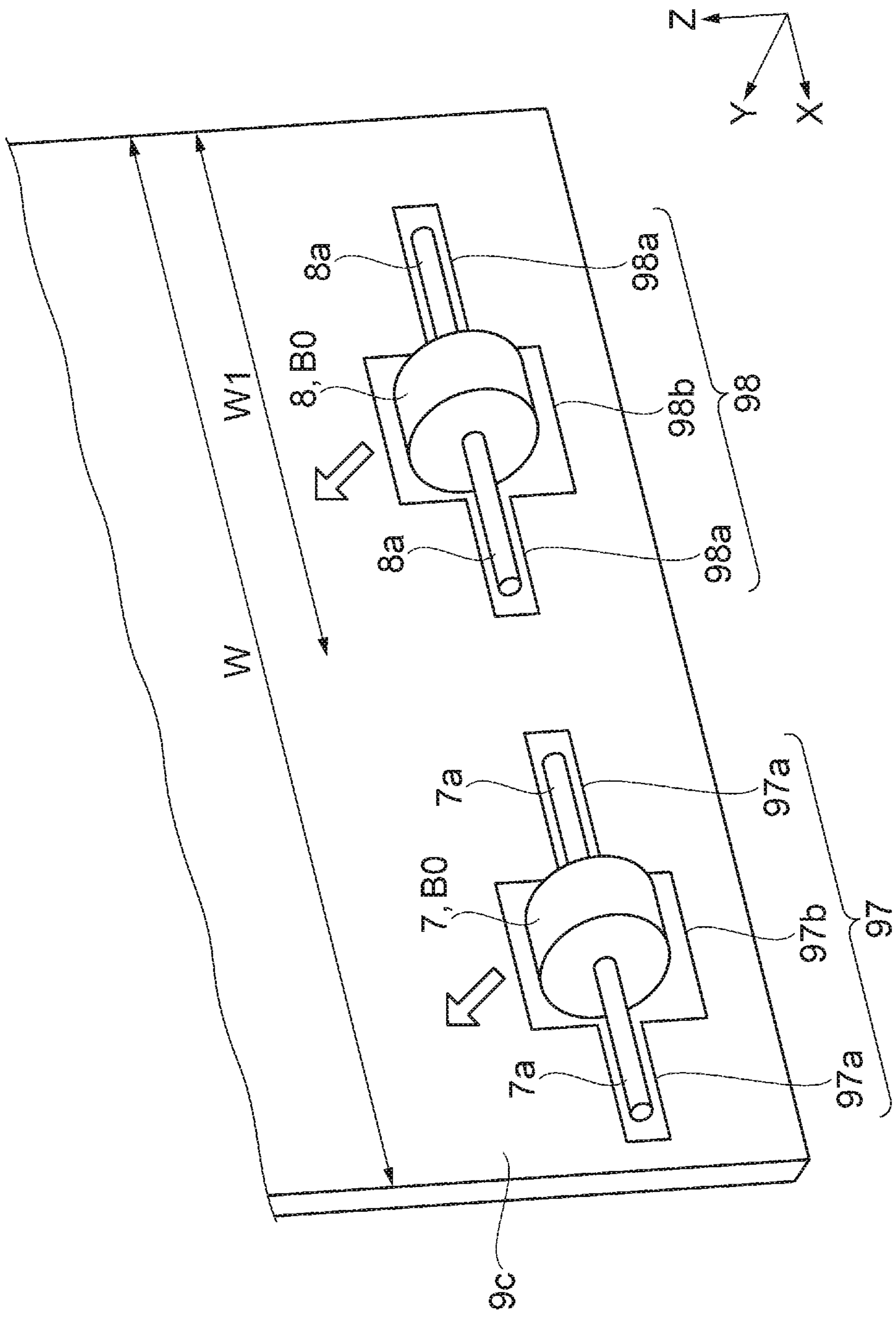
FIG. 7 is an enlarged view mainly illustrating a roller.

Here, the roller 7 will be specifically described with reference to FIG. 7. FIG. 7 illustrates an embodiment in which a plurality of rollers in which a roller 8 is added to the roller 7 are provided. The roller 7 and the roller 8 have the same configuration, and thus the roller 7 will be mainly described.

The roller 7 is made of a resin, such as plastic, and is formed into a cylindrical shape. The roller 7 includes the shaft 7*a*. The roller 7 is fixed by passing the shaft 7*a* through the center of the cylinder.

A support section 97 that supports the roller 7 is formed in the third cover guide 9*c* of the cover guide 9. The support section 97 includes a bearing 97*a* and an opening 97*b*. The bearing 97*a* rotatably supports the shaft 7*a*. The roller 7 can move in the front-rear direction through the opening 97*b*.

The shaft 7*a* is an elastic member having the elastic force, and can be elastically deformed in the front-rear direction. The shaft 7*a* is formed in a shaft shape by using, for example, a spring steel material, such as carbon steel or alloy steel.

The roller 7 can press the roll paper R in the rear direction by the elastic force of the shaft 7*a*. When the shaft 7*a* is pressed by the roll paper R, the shaft 7*a* can be elastically deformed in the front direction while pressing the roll paper R in the rear direction.

As described above, the roller 7 is rotatably supported by the cover 10 by the shaft 7*a* having the elastic force, and can move while elastically deforming the shaft 7*a*.

The roller 8 has the same configuration as the roller 7. The roller 8 includes a shaft 8*a*. A support section 98 that supports the roller 8 is formed in the third cover guide 9*c* of the cover guide 9. The support section 98 includes a bearing 98*a* and an opening 98*b*.

The roller 7 and the roller 8 are arranged in the left-right direction, which is the width direction of the roll paper R, and are attached to the third cover guide 9*c*. The roller 7 disposed on the right and the roller 8 disposed on the left can rotate and can move while pressing the roll paper R in a well-balanced manner in the left-right direction.

For example, when the roll paper R has the maximum width W that can be accommodated in the accommodation section 12, the roll paper R comes into contact with the roller 7 and the roller 8. The roll paper R having the width W can move in the front-rear direction in a well-balanced manner in the left-right direction while receiving the elastic force from the roller 7 and the roller 8. The maximum width W of the roll paper R is, for example, 80 mm.

It should be noted that, when the roll paper R has the minimum width W1, the roll paper R may come into contact with only one roller 8. The roll paper R can move in the front-rear direction in a well-balanced manner in the left-right direction while receiving the elastic force from the roller 8. The minimum width W1 of the roll paper R is, for example, 58 mm. In addition, when the diameter of the roll paper R having the minimum width W1 is smaller and lighter, two elastic forces of the roller 7 and the roller 8 act, and thus the roll paper R may bounce depending on the behavior of the roll paper R in the accommodation section 12. When the roll paper R comes into contact with only one roller 8, since only one elastic force acts, it is possible to suppress the bounce of the roll paper R.

As described above, the roller 8, which is at least a portion of the plurality of rollers 7 and 8, can come into contact with the outer circumference S of the roll paper R having the minimum width W1 that can be accommodated in the accommodation section 12.

It should be noted that the roller 7 need only be the contact member that can come into contact with the roll paper R and can move, and may be configured not to rotate. A surface of the contact member that comes into contact with the roll paper R may be, for example, formed in a cylindrical shape, an elliptical column shape, or a smooth protrusion shape. In this case, instead of the shaft 7*a*, a spring, rubber, or the like that can be elastically deformed and can move in the front-rear direction while pressing the contact member may be used for configuration. The contact member may be formed of a resin, such as plastic, and may have a front surface covered with the sheet containing the ultra high molecular weight polyethylene.

The roll paper printer 1 is configured as a so-called left reference, which performs the accommodation in the accommodation section 12 with reference to the left of the roll paper R and performs the transportation and the printing with reference to the left of the roll paper R. When the roll paper R having the width W1 smaller than the width W, the roll paper R is accommodated such that the left end of the roll paper R comes into contact with the accommodation section 12 and the right end of the roll paper R comes into contact with the partition plate inserted into the accommodation section 12.

The controller sets a print area corresponding to the width of the roll paper R to be used, with reference to the left of the roll paper R, and controls the head 2 to perform the printing within a range of the print area. As a result, the head 2 does not extend beyond the minimum width W1 of the roll paper R, for example, to perform the printing.

As illustrated in FIG. 1, in order to detect the remaining amount of the roll paper R accommodated on the left side of the accommodation section 12, the sensor 6 is disposed on the left inside the accommodation section 12. Even when the roll paper R has the minimum width W1, the sensor 6 disposed on the left side can come into contact with the roll paper R accommodated on the left side. Moreover, the roller 8 disposed on the left side can come into contact with the roll paper R having the minimum width W1.

It should be noted that, when the roll paper printer 1 is configured with reference to the right, the positional relationship described above is reversed left and right.

In addition, in the above description, two examples of the roller 7 and the roller 8 is described. In this case, the plurality of rollers including the roller 7 and the roller 8 are mounted on the cover 10, and are arranged in the width direction of the roll paper R. The number of the rollers may be two or more when corresponding to the roll paper R having a plurality of types of widths, and may be one when corresponding to only one type of width. The plurality of rollers including the roller 7 and the roller 8 are mounted on the cover 10, and are arranged in the width direction of the roll paper R.

2-4. When Roll Paper is at Near End

When the paper P is printed and further consumed, the roll paper R becomes the roll paper R having a diameter D4, which is even smaller than the diameter D3 as a small diameter and is a fourth diameter, and at which the near end is detected by the sensor 6. The diameter D4 is, for example, 20 mm. FIG. 8 illustrates the roll paper printer 1 at the time of the printing, in which the roll paper R having the diameter D4 is accommodated in the accommodation section 12.

The roll paper R disengages from the roller 7 and the rear edge of the fourth accommodation section 12*d*, and is at a position C5 to which the roll paper R is guided by coming into contact with the inside of the fourth accommodation section 12*d* of the accommodation section 12. Also, the position of the winding core R0, which is a position of the center of gravity of the roll paper R having the diameter D4, moves in the front-down direction as compared to when the roll paper R has the diameter D3.

The fourth accommodation section 12*d* having a recessed shape can stably support the roll paper R from below. The roller 7 disengages from coming into contact with the roll paper R, and is at the position B0.

When the roll paper R becomes to have the diameter D4, the sensor 6 is disengaged from coming into contact with the outer circumference S of the roll paper R, and is at the highest position A0. The sensor 6 can detect the near end when the sensor 6 is at the position A0. The controller can display the near end by the display device. The position A0 of the sensor 6 is the same as the position when the roll paper R is not accommodated in the accommodation section 12.

The user can visually recognize the display of the near end of the display device, and can accommodate the new roll paper R in the accommodation section 12. It should be noted that, even when the near end is detected, the roll paper printer 1 can also continuously perform the printing within the range in which the remaining amount of the roll paper R remains.

As described above, when the platen 3 transports the paper P, the paper P of the roll paper R is also pulled out, and the roll paper R also rotates counterclockwise in the accommodation section 12. In this case, a force for causing the roll paper R to move in the front direction acts on the roll paper R.

However, the roll paper R is stably supported by the fourth accommodation section 12*d* having a recessed shape so as not to move in the front direction.

Even when it is supposed that the roll paper R moves in the front direction, the roll paper R can come into contact with the roller 7. The roller 7 can rotate smoothly while being pressed by the roll paper R and moving from the position B0 to the position B1 while coming into contact with the outer circumference S of the roll paper R.

In this case, the rotating roller 7 can reduce the load of the friction or the like when the roll paper R rotates. As a result, the load and the load fluctuation when the platen 3 transports the paper P can be made smaller.

It should be noted that, even in this case as well, the sensor 6 is at the position A0, and a state in which the roll paper R disengages from coming into contact with the outer circumference S can be maintained. The sensor 6 can continuously detect the near end.

The tension of the paper P is smaller when the roll paper R has the smaller diameter D4 than when the roll paper R has the diameter D3. As a result, the protrusion 5 further moves toward the paper guide 4 and moves from the position M3 to a position M4 due to the reduced tension of the paper P.

In the protrusion 5 at the position M4, as compared to the protrusion 5 at the position M3, an angle of bending the paper P is even smaller, and an action of correcting the curl is even stronger. On the other hand, since the paper P is wound on a portion of the roll paper R having an even smaller diameter, the curl is even stronger. As described above, the protrusion 5 corresponds to the paper P having even stronger curl pulled out from the roll paper R having the diameter D4, and can appropriately correct the curl.

In addition, also in this case, the protrusion 5 can alleviate the change in the tension of the paper P due to the load fluctuation while pressing the paper P toward the paper guide 4, and advancing and retreating with respect to the paper guide 4.

3. Accommodation of Roll Paper R

FIGS. 9 and 10 illustrate sectional views of the roll paper printer 1 in a state in which the cover 10 is opened forward.

FIG. 9 illustrates a state in which the roll paper printer 1 does not have the roll paper R. The roller 7 is mounted on the third cover guide 9*c* of the cover guide 9. The roller 7 is movably supported by the shaft 7*a* having the elastic force. Since the roller 7 does not come into contact with the roll paper R, the roller 7 is at the position B0, which is a position before the roller 7 moves.

FIG. 10 illustrates a state in which the roll paper R is mounted on the cover guide 9 of the cover 10 opened forward by the user who attempts to accommodate the roll paper R in the accommodation section 12. The roller 7 is pressed by the roll paper R, and moves from the position B0 to the position B1.

In both cases of FIGS. 9 and 10, since the protrusion 5 mounted on the case 11 does not come into contact with the paper P, the protrusion 5 is at the position M0 that protrudes most.

The cover 10 is opened forward at an angle close to 90 degrees with respect to the case 11, and the accommodation section 12 is sufficiently opened.

When the roll paper R is accommodated in the accommodation section 12, the user need only mount the roll paper R on the cover guide 9 of the cover 10 opened forward. Then, the user can easily accommodate the roll paper R mounted on the cover guide 9 in the accommodation section 12 by simply rolling or sliding the roll paper R toward the accommodation section 12 on the rear side.

It should be noted that, since there is no roll paper R in the accommodation section 12, the sensor 6 is at the position A0 advanced upward.

As described above, the protrusion 5 is at the position M0 that protrudes most, but when the user accommodates the roll paper R in the accommodation section 12, the protrusion 5 does not get in the way. That is, it is not necessary for the user to lift the roll paper R and accommodate the roll paper R in the accommodation section 12, and there is no possibility that the user's finger or the roll paper R touch the protrusion 5.

Further, the cover 10 is opened forward, and the accommodation section 12 is sufficiently opened. The user can easily accommodate the roll paper R in the opened accommodation section 12 without the protrusion 5 getting in the way.

The cover guide 9 is configured to guide the roll paper R while supporting the roll paper R such that the roll paper R is rolled or slid toward the accommodation section 12 when the user accommodates the roll paper R in the accommodation section 12. The configuration in which the cover guide 9 guides the roll paper R will be specifically described.

The cover guide 9 includes the first cover guide 9*a*, the second cover guide 9*b*, and the third cover guide 9*c*, which are disposed in the order toward the cover hinge 10*a*, that is, in the order toward the accommodation section 12 in a state in which the cover 10 is opened.

As described above, when the cover 10 is closed, the first cover guide 9*a* and the second cover guide 9*b* can come into contact with the roll paper R having the first diameter D1, which is a large diameter, including when the roll paper R bounces. Meanwhile, the third cover guide 9*c* does not come into contact with the roll paper R having the first diameter D1.

Meanwhile, when the cover 10 is opened, the first cover guide 9*a* is in a posture of being inclined downward toward the accommodation section 12. Stated another way, the first cover guide 9*a* is inclined toward the lower right on the paper surface of FIG. 9.

The first cover guide 9*a* can guide the roll paper R having the first diameter D1 toward the accommodation section 12 via the second cover guide 9*b* and the third cover guide 9*c* along this inclination. That is, the roll paper R mounted on the first cover guide 9*a* can easily roll toward the accommodation section 12 along the first cover guide 9*a*.

The user can easily accommodate the roll paper R by rolling the roll paper R down to the accommodation section 12 by the downward inclination of the first cover guide 9*a* toward the accommodation section 12.

As described above, at least the second cover guide 9*b* is covered with the sheet containing the ultra high molecular weight polyethylene, and is configured to have smaller friction with the roll paper R other portions of the cover guide 9.

With such a sheet, the second cover guide 9*b* can reduce the friction with the roll paper R. The second cover guide 9*b* can guide the roll paper R having the first diameter D1 toward the accommodation section 12 via the third cover guide 9*c*. In this case, the roll paper R mounted on the second cover guide 9*b* can move toward the accommodation section 12 while sliding along the second cover guide 9*b*.

The user can slide and roll the roll paper R down to the accommodation section 12 by the sheet that covers the second cover guide 9*b* for reducing the friction, and can easily accommodate the roll paper R.

It should be noted that, in the embodiment, when the cover 10 is opened, the second cover guide 9*b* is not inclined downward toward the accommodation section 12, but may be inclined. The roll paper R is more easily rolled or easily slid.

In addition, in the embodiment, the first cover guide 9*a* and the third cover guide 9*c* are not covered with the sheet containing the ultra high molecular weight polyethylene, but at least a portion of the first cover guide 9*a* and the third cover guide 9*c* may be covered with this sheet. The roll paper R is more easily rolled or easily slid, and can move toward the accommodation section 12.

When the cover 10 is opened, the third cover guide 9*c* is in a posture of being inclined downward toward the accommodation section 12. Stated another way, the third cover guide 9*c* is inclined toward the lower right on the paper surface of FIG. 9.

The third cover guide 9*c* can guide the roll paper R having the first diameter D1 toward the accommodation section 12 along this inclination. The roll paper R mounted on the third cover guide 9*c* can easily roll toward the accommodation section 12 along the third cover guide 9*c*.

The user can roll the roll paper R down to the accommodation section 12 by the downward inclination of the third cover guide 9*c* toward the accommodation section 12, and can easily accommodate the roll paper R.

In addition, the third cover guide 9*c* is inclined downward toward the accommodation section 12, so that an opening of the accommodation section 12 can be widened. Since the opening of the accommodation section 12 is widened, the user easily accommodates the roll paper R having the first diameter D1.

In particular, even when the protrusion 5 is at the position M0 that protrudes most from the case 11, since the opening of the accommodation section 12 is wide, the user easily accommodates the roll paper R having the first diameter D1 without the protrusion 5 getting in the way. In other words, even when the protrusion 5 moves in a direction in which the opening of the accommodation section 12 is narrowed and the protrusion 5 is at the position M0 that protrudes most, since the third cover guide 9*c* is inclined downward toward the accommodation section 12, that is, in a direction in which the opening of the accommodation section 12 is widened, the user easily accommodates the roll paper R having the first diameter D1 without the protrusion 5 getting in the way.

It should be noted that the direction in which the opening of the accommodation section 12 is narrowed, which is a movement direction of the protrusion 5, is, for example, a direction in which the protrusion 5 moves toward the paper guide 4, but may be a direction from the inside to the outside of the case.

Further, as described above, the roller 7 is rotatably and movably mounted on the third cover guide 9*c* by the shaft 7*a* having the elastic force. As illustrated in FIG. 10, in a state in which the roller 7 is pressed by the roll paper R mounted on the third cover guide 9*c* and moves from the position B0 to the position B1, the roller 7 can rotate smoothly while coming into contact with the outer circumference S of the roll paper R.

In the above description, the example of the roller 7 is described, but the same applies to the roller 8 illustrated in FIG. 7. Further, the same applies to when the plurality of rollers are mounted on the third cover guide 9*c*.

As described above, the roll paper printer 1 according to the present embodiment includes the case 11 including the accommodation section 12 that can accommodate the roll paper R, and the cover 10 that can rotate about the cover hinge 10*a* located below the case, and opens and closes the accommodation section 12, the paper guide 4 that can guide paper P, and the protrusion 5 that can come into contact with the paper, and can move toward the paper guide 4.

The cover 10 includes the cover guide 9 that can guide the roll paper R, and the cover guide 9 include the first cover guide 9*a*, the second cover guide 9*b*, and the third cover guide 9*c* disposed in this order toward the cover hinge 10*a*.

When the cover 10 is closed, the first cover guide 9*a* and the second cover guide 9*b* can come into contact with the roll paper R having the first diameter D1. In this case, the third cover guide 9*c* does not come into contact with the roll paper R having the first diameter D1.

Meanwhile, when the cover 10 is opened, the third cover guide 9*c* is inclined downward toward the accommodation section 12, and can mount the roll paper R having the first diameter D1 and guide the roll paper R to the accommodation section 12.

With the roll paper printer 1 having such a configuration, when the cover 10 is opened, the accommodation section 12 is sufficiently opened. Even when the protrusion 5 is at the position M0 that most protrudes from the case 11, the user can easily accommodate the roll paper R having the first diameter D1 in the accommodation section 12 without the protrusion 5 getting in the way.

Further, the user can roll the roll paper R down to the accommodation section 12 by the downward inclination of the third cover guide 9*c* toward the accommodation section 12, and can easily accommodate the roll paper R. The inclination of the third cover guide 9*c* also has an effect of widening the opening of the accommodation section 12.

As described above, although the present embodiment is described with reference to the drawings, a specific configuration is not limited to the embodiment, and may be changed, replaced, deleted, or the like without departing from the gist of the present disclosure.

For example, in the above description, the head 2 is described with an example of the thermal head, but the printing method does not matter. For example, the head 2 may be an ink jet head. In this case, since the ink jet head cannot come into contact with the platen 3 and interpose the paper P, a driven roller that faces the platen 3 and interposes the paper P need only be mounted on the case 11.

In the above description, the roller 7 is made of a resin, such as plastic, but may be made of rubber or metal.

In addition, the surface of the paper P that comes into contact with the roller 7 does not have to be the surface for the printing. The roll paper R is wound such that the surface for printing the paper P is on the inside. In this case, the positions of the head 2 and the platen 3 are opposite to the positions illustrated in the drawings described above.

When the roll paper R is smaller than the diameter D1, which is a large diameter, the third cover guide 9*c* may be made to function as a guide that suppress the roll paper R that rotates as the paper P is pulled out by the platen 3 by coming into contact with the roll paper R when the roll paper R bounces upward or the like. The sensor 6 is pressed upward by the elastic member, and the roll paper R becomes lighter as the paper P is pulled out. Therefore, in particular, when the roll paper R has the diameter D3 and the distal end of the sensor 6 comes into contact with the outer circumference S of the roll paper R, the roll paper R is likely to bounce upward. For example, when the roll paper R has the diameter D3, by making the third cover guide 9*c* function as a guide that covers the upper side of the outer circumference S of the roll paper R, the third cover guide 9*c* can suppress the roll paper R by coming into contact with the roll paper R when the roll paper R bounces upward.

What is claimed is:

1. A roll paper printer comprising:

a case that is configured to include an accommodation section configured to accommodate roll paper;

a cover that is configured to rotate about a cover hinge located below the case, and is configured to open and close the accommodation section;

a paper guide that is configured to guide paper pulled out from the roll paper; and a protrusion that is configured to come into contact with the paper, and is configured to move toward the paper guide, wherein the cover includes a cover guide configured to guide the roll paper, the cover guide includes a first cover guide, a second cover guide, and a third cover guide disposed toward the cover hinge, the first cover guide is configured to come into contact with the roll paper having a first diameter, whereas the third cover guide does not come into contact with the roll paper having the first diameter, when the cover is closed, and the third cover guide is inclined downward toward the accommodation section, and is configured to guide the roll paper to the accommodation section, when the cover is opened.

2. The roll paper printer according to claim 1, wherein the first cover guide is inclined downward toward the accommodation section, when the cover is opened.

3. The roll paper printer according to claim 1, wherein at least the second cover guide is covered with a sheet, and has friction with the roll paper smaller than other portions of the cover guide.

4. The roll paper printer according to claim 1, wherein the third cover guide has a roller that comes into contact with the roll paper, is configured to rotate, and is configured to move.

5. The roll paper printer according to claim 4, wherein the roller is configured to come into contact with the roll paper having a diameter smaller than the first diameter, when the cover is closed.

6. A roll paper printer comprising:

a case that is configured to include an accommodation section configured to accommodate roll paper;

a cover that is configured to open and close the accommodation section; and a protrusion that is provided in the case, and is configured to move in a direction in which an opening of the accommodation section is narrowed, wherein a first cover guide, a second cover guide, and a third cover guide are disposed on the cover, the first cover guide is configured to come into contact with the roll paper having a first diameter, whereas the third cover guide does not come into contact with the roll paper having the first diameter, when the cover is closed, and the third cover guide is inclined in a direction in which the opening of the accommodation section is widened, and is configured to guide the roll paper to the accommodation section, when the cover is opened.

7. The roll paper printer according to claim 6, further comprising:

a paper guide that is configured to guide paper pulled out from the roll paper, wherein the protrusion is configured to move toward the paper guide.

8. The roll paper printer according to claim 6, wherein the case is configured to rotate about a cover hinge located below the case, and the third cover guide is inclined downward toward the accommodation section, when the cover is opened.

9. The roll paper printer according to claim 8, wherein the first cover guide is inclined downward toward the accommodation section, when the cover is opened.

10. The roll paper printer according to claim 6, wherein at least the second cover guide is covered with a sheet, and has friction with the roll paper smaller than other portions of the cover guide.

11. The roll paper printer according to claim 6, wherein the third cover guide has a roller that comes into contact with the roll paper, is configured to rotate, and is configured to move.

12. The roll paper printer according to claim 11, wherein the roller is configured to come into contact with the roll paper having a diameter smaller than the first diameter, when the cover is closed.

* * * * *